Feb. 20, 1934.     C. A. SABBAH     1,948,360
ELECTRIC VALVE CONVERTING SYSTEM
Filed Sept. 23, 1932
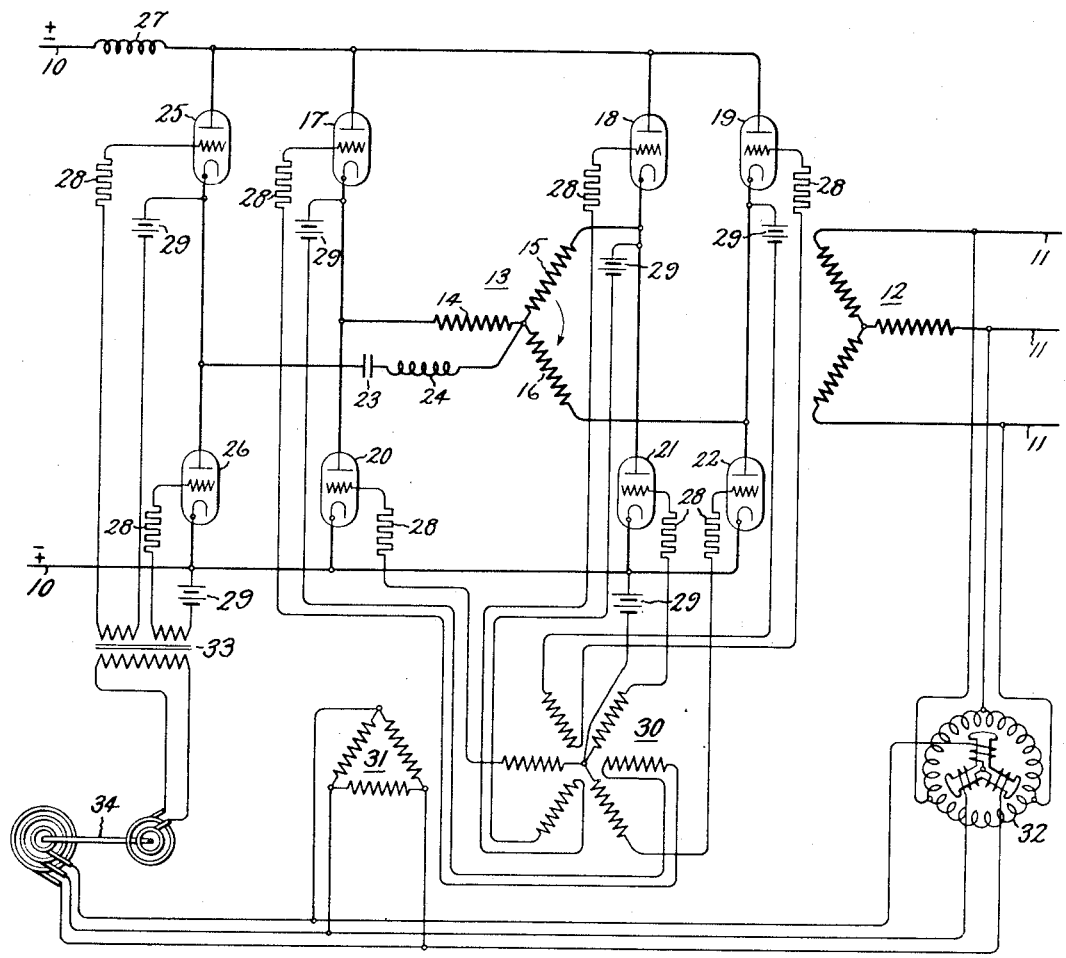
Inventor:
Camil A. Sabbah,
by Charles E. Tullar
His Attorney.

Patented Feb. 20, 1934

1,948,360

UNITED STATES PATENT OFFICE 1,948,360

ELECTRIC VALVE CONVERTING SYSTEM

Camil A. Sabbah, Schenectady, N. Y., assignor to General Electric Company, a corporation of New York Application September 23, 1932
Serial No. 634,533

6 Claims. (Cl. 175—363)

My invention relates to electric valve converting systems and more particularly to such systems for transmitting energy between a supply circuit and a load circuit, one of which is an alternating current circuit, and for controlling the power factor conditions on the alternating current circuit.

In the transmission of energy between the direct and alternating current circuits, direct current circuits of different voltages, or alternating current circuits of the same or different frequencies by means of electric valve converting apparatus, the use of valves of the vapor electric discharge type has been found particular favor because of the relatively large amounts of energy which may be handled at ordinary operating voltages. In the majority of the arrangements of the prior art, however, the use of vapor electrict discharge valves imposes rather definite power factor limitations upon the alternating current circuit of the apparatus. Without the provision of some special commutating arrangement, the current can be commutated between the several valves connected to the alternating current circuit only when the electromotive force of the alternating current circuit is of such a direction as to force the commutation. For example, when the apparatus is operating as an inverter, supplying energy from a direct current supply circuit to an alternating current load circuit, the power factor on the alternating current circuit must be leading or this power factor must be corrected by the use of capacitors included in the converting apparatus. On the other hand, when operating the apparatus as a rectifier and controlling the energy transmitted between an alternating current supply circuit and a direct current load circuit by phase controling the grids of the electric valves, the electromotive force of the alternating current circuit is effective to commutate the current between the valves only when the grid potentials are retarded with respect to the anode potentials, which corresponds to lagging power factors on the alternating current circuit.

It is an object of my invention, therefore, to provide an improved electric valve converting system which will overcome the above mentioned disadvantages of the arrangements of the prior art, and which will be simple and reliable in operation.

It is another object of my invention to provide an improved electric valve converting system including a new and improved commutating circuit for commutating the current between the several electric valves under any desired power factor conditions on the alternating current circuit.

It is a further object of my invention to provide an electric valve converting system including a new and improved commutating circuit which is effective to commutate the current between the several electric valves, even when the counter-electromotive force of the alternating current circuit interconnecting the valves opposes such commutation.

In accordance with my invention, a supply circuit and a load circuit, one of which is an alternating current circuit including a polyphase inductive winding provided with an electrical neutral, are interconnected through two oppositely connected groups of similarly disposed electric valves connected to the several phase terminals of the inductive windings. A commutating circuit including a source of commutating potential interconnects the electrical neutral of the winding with the other circuit and is effective to commutate the current between the several similarly disposed electric valves even against the electromotive force of the winding interconnecting them. In accordance with one embodiment of my invention, this commutating circuit comprises a capacitor adapted to be charged and discharged from the other circuit under the control of a pair of auxiliary electric valves.

For a better understanding of my invention, together with other and further objects thereof, reference is had to the following description taken in connection with the accompanying drawing and its scope will be pointed out in the appended claims. The single figure of the drawing illustrates an arrangement embodying my invention for transmitting energy between a direct current circuit and a three phase alternating current circuit.

Referring now more particularly to the drawing, there is illustrated an arrangement embodying my invention for transmitting energy between a direct current circuit 10 and a three phase alternating current circuit 11. This arrangement includes a polyphase transformer comprising a three phase network 12 connected to the alternating current circuit 11, and a three phase network 13, the several phase windings 14, 15 and 16 of which are connected to one side of the circuit 10 through a group of similarly disposed electric valves 17, 18, and 19, and to the other side of the direct current circuit 10 through an oppositely connected group of similarly disposed electric valves 20, 21 and 22, respectively.

In order to commutate the current between the several similarly connected electric valves there is provided a commutating circuit comprising a serially connected capacitor 23 and reactor 24 interconnecting the neutral of the network 13 with opposite sides of the direct current circuit 10 through electric valves 25 and 26, respectively. Each of the electric valves, 17—22, inclusive, and 25 and 26, is provided with an anode, a cathode and a control grid, and may be of any of the several types well known in the art, although I prefer to use valves of the vapor electric discharge type. If desired, a smoothing reactor 27 may be connected in the direct current circuit, as illustrated.

In order to render the electric valves 17—22, inclusive, alternately conductive and nonconductive in the proper sequence, the grid of each of these valves is connected to its respective cathode through a current limiting resistor 28, a negative bias battery 29, and the proper phase winding of the secondary network 30 of a grid transformer, the primary network 31 of which may be energized from the alternating current circuit 11 through any suitable phase shifting arrangement, such for example, as a rotary phase shifting transformer 32. In case the alternating current circuit 11 is not connected to an independent source of electromotive force for determining its frequency, the primary winding of the phase shifting transformer 32 may be energized from any suitable source of alternating current of a frequency which it is desired to supply to the circuit 11. The grid transformer comprising the networks 30 and 31 is preferably of the self-saturating type in order to convert the potential of the alternating current circuit 11 into one of peaked wave form, which is particularly suitable for exciting the grids of valves of the vapor electric discharge type, as is well understood by those skilled in the art, although this feature comprises no part of my present invention, but is disclosed and broadly claimed in the copending application of B. D. Bedford, Serial No. 485,335, filed September 29, 1930, and assigned to the same assignee as the present application. The valves 25 and 26 must operate to charge and discharge the capacitor 23 each time the current is commutated between a pair of electric valves, that is, every sixty electrical degrees, so that these valves must be rendered alternately conductive and nonconductive at three times the frequency at which the conductivity of the valves 17—22, inclusive, is controlled. This can be accomplished by exciting the grid of each of the valves 25 and 26 through a current limiting resistor 28 and negative bias battery 29 from independent secondary windings of a grid transformer 33, the primary winding of which is energized from the rotary phase shifting transformer 32 through a small frequency changing set 34, as illustrated.

The general principles of operation of the above described apparatus will be well understood by those skilled in the art. For example, if it be assumed that the apparatus is operating as an inverter, transmitting energy from the direct current circuit 10 to the alternating current circuit 11, and that electric valves 18 and 22 are initially rendered conductive, current will flow from the upper positive side of the direct current circuit through the valve 18, the phase windings 15 and 16 and the valve 22 to the other side of the direct current circuit. Assuming a phase rotation as indicated by the arrow, substantially sixty electrical degrees later, electric valve 20 will be rendered conductive and the current commutated from the valve 22 to the valve 20. Sixty degrees later, electric valve 19 will be rendered conductive and the current will be commutated from the valve 18 to the valve 19. In this manner the current is successively commutated between the valves 17, 18 and 19, and 20, 21 and 22 to supply polyphase alternating current to the circuit 11.

Under certain cases, however, it may be desirable to control the power factor conditions on the alternating current circuit 11 or to control the energy transmitted between the circuits 10 and 11 in such a manner that it is necessary to commutate the current between the several similarly disposed electric valves when the electromotive force of the winding interconnecting these valves opposes such commutation. For example, assume that it is desired to commutate the current from the valve 22 to the valve 20 at a point in the cycle when the counter-electromotive force of the winding 14 is greater than that of the winding 16, so that the resultant electromotive force of these two windings opposes such commutation. This may be accomplished by rendering the valve 25 conductive at approximately the same time that the valve 22 is rendered conductive, with the result that the capacitor 23 will become charged through the valve 25 to a potential approximately equal to the difference between the positive side of the direct current circuit and the neutral of the network 13. If then electric valve 26 is rendered conductive simultaneously with electric valve 20 or slightly before, the potential of the capacitor 25 will be effective to initiate the current in the valve 26 and interrupt the current in the valve 22; that is, to commutate the current from the valve 22 to the valve 26. The reactance 27 included in the direct current circuit will tend to maintain the average load current through this circuit including the valve 26, and the condenser 23 soon becomes charged to such a potential that the counter-electromotive force of this circuit is greater than that of the circuit including the winding 14 and the valve 20, with the result that current now automatically transfers to this circuit and commutation has been effected from the valve 22 to the valve 20. Capacitor 23 is now charged so that its left hand terminal is negative and its right hand terminal positive. Sixty electrical degrees later when it is desired to transfer the current from the valve 18 to the valve 19 at a point in the cycle when the electromotive force of the windings interconnecting these valves opposes such commutation, the valve 25 is rendered conductive and the capacitor 23 will be effective to commutate the current first from the valve 19 to the valve 25 and subsequently, when the capacitor 23 becomes charged to a predetermined potential, to the valve 18. In this manner, the current may be successively commutated between the several similarly disposed electric valves at any point in the cycle of electromotive force of the circuit 11 by properly adjusting the rotary phase shifting transformer 32 which controls the phase angle of the grid potentials supplied to all of the electric valves. The reactor 24 included in the commutating circuit 23 is effective to extend the period during which current is commutated between the several electric valves and thus reduce the transient voltages which are likely to accur in the several parts of the circuit. By properly adjusting the rotary phase shifting transformer 32 the phase angle of the grid potentials of all the several electric valves may be controlled to control the energy transmitted between the circuit 10 and the alternating current circuit 11 and the power factor conditions on the alternating current circuit 11.

Although I have illustrated and described my invention as applied to an arrangement for transmitting energy from a direct current circuit to an alternating current circuit, it will be obvious to those skilled in the art that the operation is similar when transmitting energy in the opposite direction, that is, with the apparatus operating as a rectifier. Furthermore, the above described apparatus may be duplicated and the additional apparatus connected oppositely with respect to the circuit 10, in case the circuit 10 is an alternating current circuit, in which case the two apparatus operate together as a frequency changer.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent in the United States is:

1. An electric valve converting system comprising a supply circuit, a load circuit, one of said circuits being an alternating current circuit and including a polyphase inductive winding provided with an electrical neutral, two oppositely connected groups of similarly disposed electric valves interconnecting the several terminals of said winding with the other of said circuits, means for rendering said valves conductive and nonconductive in a predetermined sequence, and means for commutating the current between the valves of a group against the electromotive force of the winding interconnecting them comprising a source of commutating potential connected between said neutral and the other of said circuits.

2. An electric valve converting system comprising a supply circuit, a load circuit, one of said circuits being an alternating current circuit and including a polyphase inductive winding provided with an electrical neutral, two oppositely connected groups of similarly disposed electric valves interconnecting the several terminals of said winding with opposite sides of the other of said circuits, means for rendering said valves conductive and nonconductive in a predetermined sequence, and a commutating circuit including a capacitor connected between said electrical neutral and the other of said circuits for commutating the current between the several valves of a group under any desired power factor conditions on said alternating current circuit.

3. An electric valve converting system comprising a supply circuit, a load circuit, one of said circuits being an alternating current circuit and including a polyphase inductive winding provided with an electrical neutral, two oppositely connected groups of similarly disposed electric valves interconnecting the several terminals of said winding with opposite sides of the other of said circuits, means for rendering said valves conductive and nonconductive in a predetermined sequence, a commutating circuit including a capacitor connected between said neutral and the other of said circuits for commutating the current between the several valves of a group under any desired power factor conditions on said alternating current circuit, and auxiliary electric valve means for controlling the charging and discharging of said capacitor.

4. In combination, a direct current circuit, an alternating current circuit, apparatus for transmitting energy therebetween comprising a polyphase inductive winding provided with an electrical neutral, two oppositely connected groups of similarly disposed electric valves interconnecting the several terminals of said winding with opposite sides of said direct current circuit, means for rendering said valves alternately conductive and nonconductive in a predetermined sequence, and means for commutating the current between the valves of a group against the electromotive force of the winding interconnecting them comprising a commutating capacitor having one terminal connected to said neutral, a pair of oppositely connected electric valves interconnecting the other terminal of said capacitor with opposite sides of said direct current circuit, and means for controlling the conductivity of said pair of valves.

5. In combination, a direct current circuit, an alternating current circuit, apparatus for transmitting energy therebetween comprising a $p$-phase polyphase inductive winding provided with an electrical neutral, two oppositely connected groups of similarly disposed electric valves interconnecting the several terminals of said winding with opposite sides of said direct current circuit, means for rendering said valves alternately conductive and nonconductive in a predetermined sequence, and means for commutating the current between the valves of a group against the electromotive force of the winding interconnecting them comprising a commutating circuit including a serially connected capacitor and reactor and having one terminal connected to said electrical neutral, a pair of oppositely connected electric valves interconnecting the other terminal of said commutating circuit with opposite sides of said direct current circuit, and means for rendering said pair of valves alternately conductive and nonconductive at a frequency of $p$ times that of said alternating current circuit.

6. In combination, a direct current circuit, an alternating current circuit, apparatus for transmitting energy therebetween comprising a $p$-phase polyphase inductive winding provided with an electrical neutral, two oppositely connected groups of similarly disposed electric valves interconnecting the several terminals of said winding with opposite sides of said direct current circuit, means for rendering said valves alternately conductive and nonconductive in a predetermined sequence, and means for commutating the current between the valves of a group against the electromotive force of the winding interconnecting them comprising a commutating capacitor having one terminal connected to said neutral, a pair of oppositely connected electric valves interconnecting the other terminal of said capacitor with opposite sides of said direct current circuit, and means for varying the phase of the valve conductivity controlling means to vary the power factor conditions on said alternating current circuit.

CAMIL A. SABBAH.